Oct. 30, 1956 W. FEW 2,769,130
D. C. MOTOR CONTROL
Filed Nov. 9, 1953
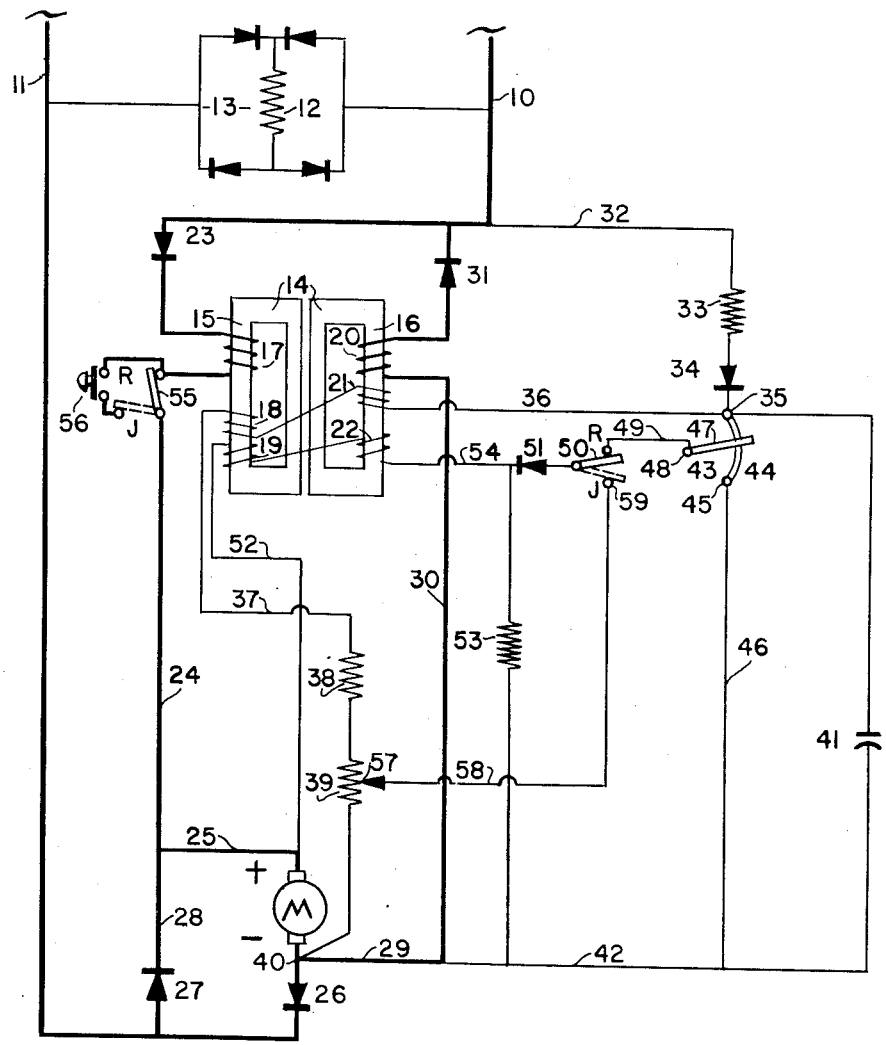
INVENTOR.
William Few.
BY
Harry R. Canfield

# United States Patent Office 2,769,130
Patented Oct. 30, 1956

2,769,130
D. C. MOTOR CONTROL

William Few, Goshen, Ind., assignor to The Clark Controller Company, Cleveland, Ohio, a corporation of Ohio Application November 9, 1953, Serial No. 390,811

6 Claims. (Cl. 318—331)

This invention relates to systems of control in which a D. C. motor is energized from single phase A. C. supply mains, and automatically controlled to run at a constant speed.

It is an object of the invention to provide a control of this class that will be simple and economical to manufacture and at the same time accurate and reliable in its operation.

Another object is to provide an improved control of the class referred to, by which the motor may be automatically accelerated from rest, with or without a load thereon and brought up to a preselected running speed, and thereafter automatically maintained at that speed, constantly, even if the driven load should vary.

Another object is to provide a control in which the features of control referred to in the preceeding paragraph are all performed by the same functioning elements of the control.

Another object is to provide a control, operating automatically as referred to above, and having no moving parts other than a manually operable control potentiometer device, or rheostat, to accelerate the motor and preset the constant speed.

Another object is to provide a control having the features referred to above in which a single potentiometer device may be manually operated to accelerate the motor, and may be positioned to preselect the constant speed at which the motor is to run, and may be operated to vary the constant speed from time to time if desired.

Another object is to provide a control system as referred to, having an improved arrangement of dry plate rectifiers in control lines of the system.

Another object is to provide in a system of the class referred to, means for effecting full running speed of the motor, or, optionally, intermittent inching or "jogging" control thereof; and means for automatically limiting the motor speed on jogging to a low maximum speed.

It is one of the advantages of the invention that the tendency of the motor to vary in speed is sensed by a reactor of the magnetic amplifier class, and corresponding corrective changes in motor current are thereby effected with a high degree of sensitivity.

It is another advantage that, except in the case of the field-energizing rectification, only single or individual rectifiers are utilized, whereby the system is simplified, and each rectifier performs individual rectification at the point where needed; and it is not necesary to utilize a plurality of rectifiers to provide a source of direct current, as employed in some motor control systems.

Also the amplifier and its windings are arranged so that the flux or magneto motive force of the control windings is in series on a leg of the amplifier core with that of the main windings and not on another and parallel leg, as has heretofore been employed; whereby lack of sensitivity of response to the control windings caused by leakage of flux, is obviated.

Another object is to provide a constant speed motor control system as referred to in which the current supplied to the motor is caused to vary in response to tendencies of speed to vary, and with great sensitivity, by means of a magnetic amplifier, having a core arranged to minimize leakage.

With these objects in view, and others which will occur to those skilled in the art to which the invention appertains, including the provision of certain self protecting features, the invention comprises, in general the following; the actual invention being that set forth in the appended claims.

A field for the motor is energized always at the same value by unidirectional current rectified from the A. C. supply mains.

A reactor of the type having cores with main windings and saturation control windings thereon, has the main windings connected in series with the motor armature across the A. C. supply lines and through individual rectifiers arranged so that the half waves of the A. C. supply flow in the main windings of the reactor and full waves rectified flow unidirectionally in the armature.

Biasing windings preferrably of fixed value on the reactor, neutralize residual flux left in the cores by the half waves, upon reversal of the A. C. alternations.

Control windings on the cores are energized by the difference in potential between the unidirectional counter E. M. F. of the motor, and a unidirectional reference potential opposed thereto; means being provided to establish and adjustably vary the reference potential. And the control windings are poled to saturate or partially saturate the cores, in the direction to correspondingly reduce the reactance of the main windings.

With the reference potential at zero, or at a low value, the reactance of the main windings limits the motor current to a low value.

As the reference potential is increased, the control windings decrease the reactance and more current flows to the motor to accelerate it.

When the reference potential is set at a chosen high value, the reference potential predominates over the counter E. M. F. just enough to maintain the reactance at a value which will give the motor a value of current at which it will run at a corresponding constant speed.

Upon any tendency of the motor speed to fall below the pre-set constant speed, for example, because of an increase of motor driven load, its counter E. M. F. tends to decrease; and the set reference potential predominates more, and the motor is given more current to maintain the constant speed; and vice versa upon any tendency of the motor speed to increase.

The said reference potential is derived from a rheostat, preferably of the potentiometer type, supplied with unidirectional current rectified from the supply lines by an individual rectifier; and having a manually operable part by which the reference potential derived therefrom may be varied or pre-set as referred to.

For inching or jogging of the motor, an adjustable low reference potential is derived in the system from a resistor in the circuit of the biasing windings and acting as a voltage divider, whereby the motor speed is prevented from rising above a predetermined low speed.

The magnetic amplifier is rendered more sensitive to changes of control winding current, by making its core in two closed magnetic circuit parts, and by having each of the aforesaid group of windings; main winding, biasing winding and control winding, on a different one of the parts and thereby isolated magnetically from the other group.

A preferred embodiment of the invention is fully disclosed in the following description taken in connection with the accompanying drawing the single figure of which is a view illustrating the embodiment in diagrammatic form.

Referring to the drawing there is shown at 10 and 11, A. C. mains which may be connected to a supply not shown through a line switch in a well known manner.

The field of the motor is shown at 12, energized always at constant value with unidirectional current by means of a rectifying network 13, of well known form, connected across the A. C. lines 10—11.

At 14 is a reactor having separate core parts 15—16 which may be referred to as core legs. A main winding 17, a biasing winding 18, and a control winding 19 are on the leg 15. A main winding 20, a biasing winding 21, and a control winding 22 are on the leg 16.

The main winding 17 is in a circuit from the line 10, through a rectifier 23, the winding 17, a switch 55 to be referred to, wires 24—25, through the motor armature M, and a rectifier 26 to the line 11. The main winding 20 is in a circuit from the line 11, through a rectifier 27, wires 28 and 25, through the motor armature M, and by wires 29—30, through the winding 20, and a rectifier 31 to line 10.

By this arrangement both half waves of the A. C. flow through the armature M as unidirectional current; and half waves of opposite polarity respectively flow through the windings 17 and 20, that is, unidirectionally. The windings 17 and 20 are preferably poled so that their fluxes both flow in the same direction, say, upwardly, as viewed in the drawing.

The biasing windings 18—21 are connected in series as shown, and are both energized with unidirectional current as follows: from line 10 by a wire 32 through a resistor 33 and a rectifier 34 to a point 35; thence by wire 36, through the windings 21—18, by a wire 37, through resistors 38—39, to a point 40 on the negative side of the armature M, thence through rectifier 26 to line 11.

The windings 21—18 are thus across the lines 10—11 and get half positive waves of alternating current by rectification at the rectifiers 34 and 26, and this unidirectional energization is preferably of fixed amount, predetermined by the resistors 38—39.

A capacitor 41, bridging the points 35 and 40 by way of wires 42 and 29 and charged during the said positive half waves, discharges and maintains the potential on the biasing windings 21—18 during the negative half waves.

A potentiometer type of rheostat is shown at 43 and has a resistor 44 between points 35 and 45. The resistor 44 is connected between the point 35 and the point 40 by wires 46—42—29 and the resistor 44 is thus connected across the lines 10—11 through rectifiers 34 and 26, and is energized with positive half waves of the alternating line potential; the capacitor 41 again maintaining energization during the negative half waves.

A manually rotatable potentiometer arm 47 is connected by wire 49 through an optional switch 50 to be described, through a rectifier 51 to the control windings 22—19 in series, which are then connected by a wire 52 to the positive side of the armature M.

With this arrangement, the control windings 19—22 are connected in a closed circuit across the armature M in series with the rectifier 51; and that part of the potentiometer resistor 44 between the points 48 and 45.

The control winding circuit is thus subjected to two opposing unidirectional potentials; one that at the point 48 caused by drop of potential in the potentiometer resistor between points 48 and 45, and the other being the counter E. M. F. of the motor.

Due to the rectifier 51, current can flow in only one direction in this circuit, and flows first through the winding 22 and then through the winding 19, and these windings are poled so that their fluxes, respectively, are in the same directions at the fluxes of the main windings 17 and 20.

A resistor 53 is bridged across the wire 54 at the output side of the rectifier 51 and the wire 42.

The operation of the control will now be described.

When the potentiometer arm 48 is rotated around to the point 45 therewill be no potential at the point 48, and when it is moved by increments over the resistor 44 toward the point 35, drop of potential occurs by corresponding increments, and will appear at the point 48 and will be referred to as potentiometer potential, or reference potential.

With the motor at rest and the potentiometer arm on the point 45, the control windings 19—22 will be de-energized due to zero counter E. M. F. of the motor and zero reference potential.

The biasing windings 18—21, constantly energized as described, neutralize residual flux in the reactor cores 15—16 and the reactance of the windings is therefore maximum and they pass very small current to the motor, which may be insufficient to start it.

Moving the potentiometer arm 48 to raise the potentiometer potential causes it to energize the control windings 19—22 in the direction to increase the flux in the windings 17—20 reducing their reactance causing them to pass more current to the armature and the motor starts, and as the potentiometer potential is increased more and more, the motor accelerates.

With the potentiometer arm set at a predetermined position, giving corresponding potentiometer potential, the motor comes up to a corresponding speed and runs at that speed.

The counter E. M. F. of the motor rises as it speeds up, as referred to, and opposes the potentiometer potential but does not equal it. If it did, hypothetically, the control windings would again be de-energized giving the motor again a very small current insufficient to keep it running.

The motor thus always comes up to a running speed at which the difference between the counter E. M. F. and the potentiometer potential is just enough to energize the control windings just enough to cause the motor to get just enough current to keep it running at a constant running speed, corresponding to the setting of the potentiometer.

If the motor should "try" to exceed that speed, as it might for example, if its driven load were reduced, the resulting increased counter E. M. F. would reduce the energization of the windings 19—22 and cause the main windings to pass less current and the motor would slow down again to its constant running speed.

Similarly the motor running speed is maintained constant upon the occurrence of any tendency to go slower, as by an increase in driven load.

The potentiometer potential may be referred to as a "reference" potential against which or with which the motor E. M. F. is continuously "compared."

While the potentiometer potential is normally at all times greater than the counter E. M. F. potential, it could inadvertently be made less, while the motor is running, if the potentiometer arm were quickly moved back to a lower potentiometer potential position; and the direction of current in the control windings 19—22 would then reverse. The rectifier 51 prevents such reversal, in such an instance, and stops reverse current flow and de-energizes the windings 19—22 and the motor therefore will, in such an instance slow down until its counter E. M. F. is again less than the potentiometer potential.

This action may be made still more effective by providing the resistor 53, which makes a high impedance path for the reverse current in the windings 19—22, if it occurs, causing their fluxes to reverse and oppose the fluxes of the windings 17—20 and increasing the reactance thereof and thereby reduce the motor current and shorten the slowing down time of the motor.

The resistor 53 also provides a low current path for current through the rectifier 51 even in instances when the potentiometer potential is momentarily less than the counter E. M. F. to protect the rectifier from the reversed potential thereon and to keep it working as a rectifier.

There are times when it is desirable to operate the motor at low speed, and, at times, intermittently, with a jogging or inching movement.

This is provided for as follows.

The aforesaid switch 50 has a normal solid line position designated "R," meaning normal running position; and a position in dotted lines designated "J" meaning jogging position.

When the switch 50 is moved to the jogging position, the potentiometer potential at the point 48 is cut off from the control windings 19—22 and in its place is substituted a constant unidirectional potential of lower value derived from the resistor 39.

The current in the constantly energized biasing windings 18—21 flows through the resistor 39, and an intermediate tap connection is made thereon at an adjustable point 57 connected by a wire 58 to a point 59 of the switch 50 engaged in its dotted line position.

The control windings 19—22 are then subjected to a low reference potential from the point 57 and they reduce the reactance of the main amplifier windings only a little and little current flows to the motor; and the motor runs at a low speed because it counter E. M. F. is now "compared" with a low reference potential, as will be understood from the foregoing description.

By operating the switch 50, back and forth, the speed of the motor will be changed to a low speed and then restored to the normal speed again without disturbing the normal full running speed setting of the potentiometer.

Upon putting the switch 50 in an open position, and thereby cutting off both the said low reference potential and the higher one of the potentiometer, the motor as described will receive very little current or may not run at all, and by intermittently operating the switch to engage the contact point 59, the motor will receive impulses of small current, and can be jogged or inched ahead, for any of the well known purposes.

As a further and more sensitive means for inching or jogging, a switch 55 is provided having a solid line position designated "R" for running and a dotted line position designated "J" for jogging. The switch 55 is directly in series with one of the main windings, for example, the winding 17 as shown, and when moved to jogging position it connects the winding 17 in series with a normally open contactor 56, which cuts off the winding 17. By intermittently closing and opening the contactor 56, the winding 17 will be alternately cut in and out; and as will be understood the motor will receive, for the respective positions of the contactor, rectified full waves of current and half waves of current.

With the switch 50 set for jogging at the low reference potential, and with the switch 56 closed, the motor will have a low constant speed as described. When the contactor 56 is opened, giving the motor only half waves, tending to slow it down, the low reference potential opposing a correspondingly reduced counter E. M. F. will tend to hold its speed up to the low constant value, but because the motor is receiving only half waves, and because the reference potential is low, the motor cannot maintain its low constant speed but will run at a still lower minimum speed.

Thus with the contactor 56 open the motor has a very low minimum speed, and upon closing the contactor 56 its speed comes up to a higher but still low speed; and by intermittently operating the switch 56 the motor may be sensitively inched or jogged along.

As mentioned, the speed of the motor adjusts itself to a speed at which the reference potential predominates over the counter E. M. F. potential to energize the control windings; and if the reference potential be quickly reduced, reverse current of considerable value would tend to flow in the potentiometer circuit, and in the control windings, but this is prevented by the rectifier 51. The rectifier 51 performs this function whether the reference potential is lowered by the potentiometer or by moving the switch 50; and in either such event, the control windings 19—22 are momentarily substantially unenergized, or energized to a low value reversely through the resistor 53, and the amplifier windings deliver low current to the motor and it slows down until the reference potential again predominates.

The amplifier core legs 15—16 are isolated from each other as shown in the drawing, each being a closed magnetic circuit; and the group of windings 17—18—19 are all axially aligned on a rectilinear portion of one core leg 15, and the group of windings 20—21—22 similarly axially aligned on a rectilinear portion of the other core leg 16.

By this construction of amplifier, leakage of flux from any winding is reduced to the minimum or entirely obviated whereby the response of the amplifier to changes of control current is rendered highly sensitive.

I claim:

1. A motor control system for a direct current motor to energize it by rectified alternating current, and maintain its speed constant, comprising: first and second alternating current supply mains; a magnetic amplifier having a pair of core legs; a circuit connecting a first rectifier, one main winding, the motor armature, and a second rectifier, in series and in the order named, between the first and second mains; a circuit connecting a third rectifier, the motor armature, the other main winding, and a fourth rectifier, in series and in the order named, between the second and first mains; biasing windings on the respective core legs in magnetic opposition to the main windings respectively; a circuit connecting a fifth rectifier, the two biasing windings, a biasing winding resistor, and the second rectifier, in series and in the order named, between the first and second mains; a potentiometer comprising a potentiometer resistor and an adjustably movable connection point thereon; a circuit connecting the fifth rectifier, the potentiometer resistor, and the second rectifier, in series and in the order named, between the first and second mains; control windings on the respective core legs magnetically augmenting the respective main windings; a potentiometer circuit connecting a sixth rectifier and the two control windings in series and in the order named, between the movable point of the potentiometer and the side of the motor armature opposite the second rectifier; jogging switch means connected directly in series with one of the main windings and operable by an operator to intermittently open and close the circuit therethrough; switch means in the part of the potentiometer circuit between the sixth rectifier and the poentiometer point, operable optionally to disconnect the sixth rectifier from the potentiometer point and to connect it to an intermediate point on the biasing winding resistor; a capacitor connected between the fifth and second rectifiers; a shunt motor field; and a rectifying loop between the first and second mains, energizing the field with constant unidirectional current.

2. A motor control system for energizing a direct current motor from alternating current supply mains and normally automatically maintaining its speed at an adjusted constant speed; comprising: a magnetic amplifier having main windings and saturation-control windings and compensating windings, circuit means including rectifiers for energizing the main windings fromthe supply mains with alternate half waves of alternating current respectively, and the motor with both said half waves unidirectionally; a potentiometer resistor; circuit means including rectifier means for energizing the resistor with alternate half waves of alternating current from the supply mains, and the resistor having an intermediate point variably positionable thereon and in each position thereof establishing a reference potential thereat; circuit means including a switch having two positions, and a connection from the control windings through the switch in one position to the potentiometer point to subject the control windings to the reference potential, and including other connections subjecting the control windings to the motor counter E. M. F. in opposition to the reference potential; a circuit including rectifier means energized from the supply mains with half waves of alternating current and containing a resistor with an intermediate tap connection and circuit means by which the said switch when moved to its other position, disconnects the control windings from the potentiometer point and connects the control widings to the said resistor tap connection.

3. A direct current motor control system energized from alternating current mains, the motor receiving current through main windings of a magnetic amplifier, rectified by rectifiers to be half waves in the respective windings and unidirectional full waves in the motor armature; the current value of the half waves controlled by the value of energization of saturation-control windings on the amplifier; means establishing a unidirectional reference potential, comprising a potentiometer resistor energized across the mains through rectifier means and having an adjustable intermediate potentiometer point at the reference potential; circuit means subjecting the control windings to the difference between the motor counter E. M. F. and the reference potential comprising connections connecting the windings at one end to the potentiometer point; a circuit including a voltage drop resistor energized across the mains through rectifier means, and having an intermediate tap point at a lower reference potential than the potentiometer reference potential; a switch and connections thereto operable to disconnect the control windings from the potentiometer point and connect them to the tap point; and a rectifier between the switch and the control windings poled to cause current to flow only in the direction from the potentiometer point or the tap point to the control windings.

4. A direct current motor control system energized from alternating current mains, the motor receiving current through main windings of a magnetic amplifier, rectified by rectifiers to be half waves in the respective windings and unidirectional full waves in the motor armature; the current value of the half waves controlled by the value of energization of saturation-control windings on the amplifier; means establishing a unidirectional reference potential comprising a resistor energized across the mains through rectifier means and having an intermediate tap point thereon at the reference potential; circuit means subjecting the control windings to the difference between the motor counter E. M. F. and the reference potential comprising connections connecting the control windings at one end to the tap point; contactor means directly in series with one of said main windings and operable to open the circuit thereof to cause the motor armature to be energized with half waves of only one polarity through the other winding.

5. A direct current motor control system energized from alternating current mains, the motor receiving current through main windings of a magnetic amplifier, rectified by rectifiers to be half waves in the respective windings and unidirectional full waves in the motor armature; the current value of the half waves controlled by the value of energization of saturation-control windings on the amplifier; means for causing the motor to run at either of two preselected constant speeds and means operable to effect the change from either speed to the other, comprising: a first and a second resistor each energized across the mains through rectifier means and each having an intermediate tap point at a reference potential, one higher than the other; circuit means subjecting the control windings to the difference between the motor counter E. M. F. and one reference potential comprising connections connecting the control windings at one end to one tap point through switch means; and the switch means being operable to disconnect the control windings from said one tap point and connect them to the other tap point.

6. A motor control system for energizing a direct current motor from alternating current supply mains and normally automatically maintaining its speed at an adjusted constant speed; comprising: a magnetic amplifier having main windings and saturation-control windings and compensating windings; circuit means including rectifiers for energizing the main windings from the supply mains with alternate half waves of alternating current respectively, and the motor with both said half waves unidirectionally; a potentiometer resistor; circuit means including rectifier means for energizing the resistor with alternate half waves of alternating current from the supply mains, and the resistor having an intermediate point variably positionable thereon and in each position thereof establishing a reference potential thereat; circuit means including a switch having two positions, and a connection from the control windings through the switch in one position to the potentiometer point to subject the control windings to the reference potential, and including other connections subjecting the control windings to the motor counter E. M. F. in opposition to the reference potential; a circuit containing rectifier means, and said compensating windings and energized from the supply mains with half waves of alternating current and containing a resistor with an intermediate tap connection and circuit means by which the said switch when moved to its other position, disconnects the control windings from the potentiometer point and connects the control windings to the said resistor tap connection.

References Cited in the file of this patent

UNITED STATES PATENTS

| | | |
|---|---|---|
| 2,554,203 | Morgan | May 27, 1951 |
| 2,558,086 | Herchenroeder | June 26, 1951 |
| 2,558,094 | King | June 26, 1951 |
| 2,675,513 | Malick | Apr. 13, 1954 |
| 2,677,088 | Malick | Apr. 27, 1954 |

FOREIGN PATENTS

| | | |
|---|---|---|
| 1,048,540 | France | Aug. 5, 1953 |

OTHER REFERENCES

Publication—"Magnetic Amplifiers in Industry," Westinghouse Engineer, vol. 10, issue 5, September 1950, pp. 201–205.